United States Patent [19]

Georgopoulos

[11] Patent Number: 4,601,319
[45] Date of Patent: Jul. 22, 1986

[54] INSTALLATION HARDWARE FOR VENETIAN BLIND IN A VAN WINDOW FRAME

[75] Inventor: George Georgopoulos, Pine Brook, N.J.

[73] Assignee: Levolor Lorentzen, Inc., Lyndhurst, N.J.

[21] Appl. No.: 597,657

[22] Filed: Apr. 6, 1984

[51] Int. Cl.[4] .............................................. E06B 9/38
[52] U.S. Cl. .................................................. 160/178 B
[58] Field of Search .................. 160/107, 166–178 R, 160/276, 280, 288, 289, 323–326, 178, 173, 166 A; 211/105.5, 106.5; 248/264, 268, 257; 403/166, 326, 327, 348, 349

[56] References Cited

U.S. PATENT DOCUMENTS

| | | |
|---|---|---|
| 390,392 | 10/1888 | Niss, Jr. ............................ 248/264 |
| 762,330 | 6/1904 | Mansell ............................ 160/317 |
| 2,027,570 | 1/1936 | Zingg ............................... 160/177 |
| 2,181,101 | 11/1939 | Spenard ........................... 160/349 |
| 2,206,796 | 7/1940 | Williams ......................... 160/166 A |
| 2,520,524 | 8/1950 | Bretz, Jr. .......................... 160/107 |
| 2,901,035 | 8/1959 | Anderle ........................... 160/178 R |
| 3,151,665 | 10/1964 | Stock ................................ 160/236 |
| 3,156,294 | 11/1964 | Miller et al. ..................... 160/289 |
| 3,267,117 | 8/1966 | Lorentzen et al. ............... 160/174 |
| 3,818,969 | 6/1974 | Debs ................................ 160/168 |
| 4,444,239 | 4/1984 | Haines ............................. 160/107 |
| 4,541,469 | 9/1985 | Dressell ........................... 160/166 |

Primary Examiner—Robert W. Gibson, Jr.
Assistant Examiner—Cherney S. Lieberman

[57] ABSTRACT

Tensioned brackets secure the head or bottom rail of a venetian blind to the side frame of a van window. Sealing means are mounted on the bracket to prevent gaps between the rails and the side frame.

5 Claims, 7 Drawing Figures

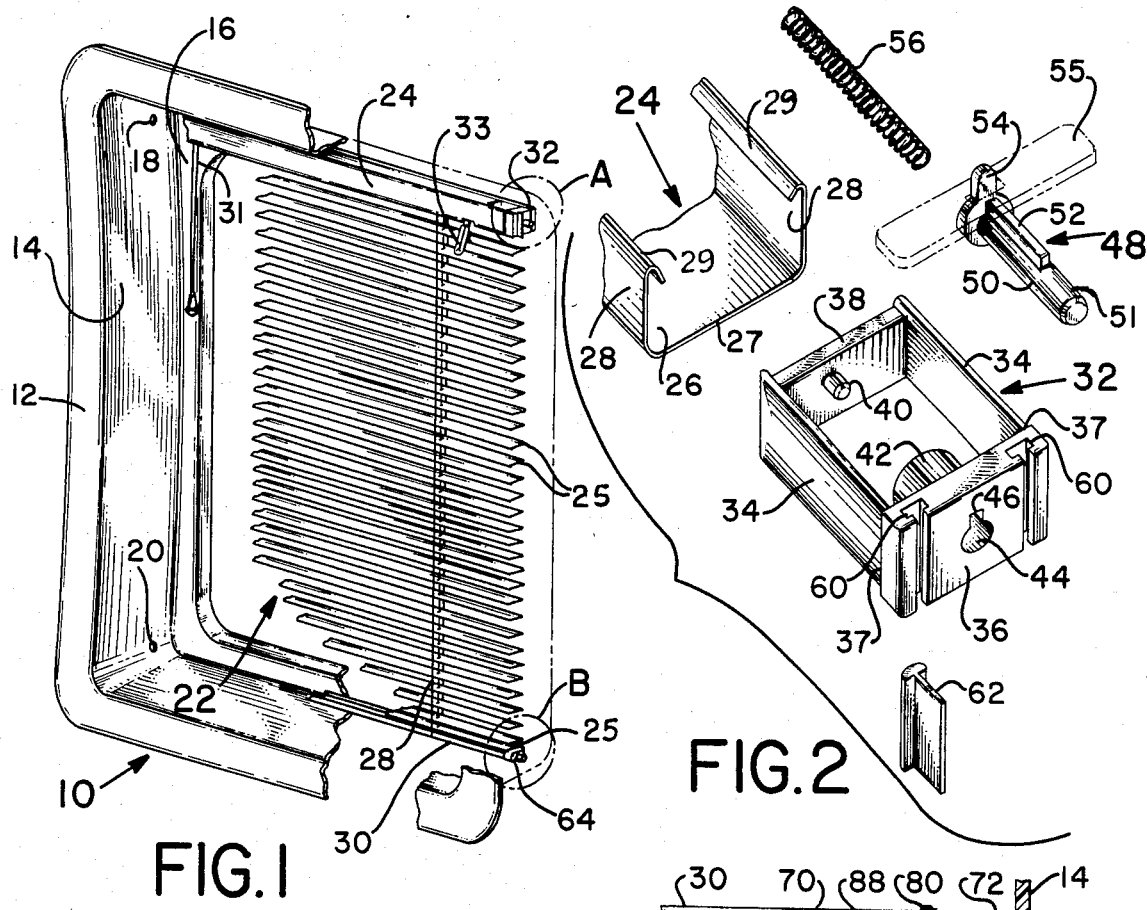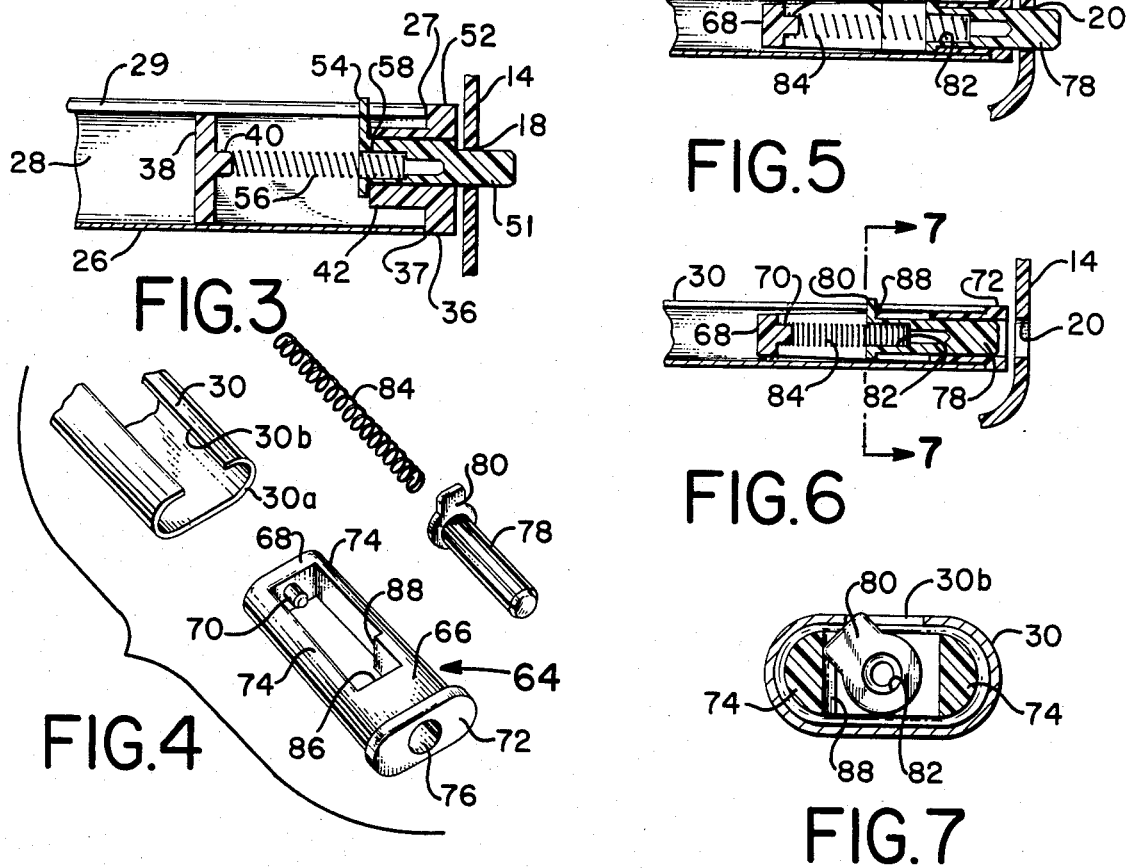

INSTALLATION HARDWARE FOR VENETIAN BLIND IN A VAN WINDOW FRAME

BACKGROUND OF THE INVENTION

The present invention relates to hardware for installing a venetian blind in a window frame of an automotive vehicle, especially a van. More specifically, it relates to installation brackets for the head rail and bottom rail of a venetian blind to be installed in a van window frame.

Vans have relatively large windows compared to other automobiles, and they are of a special design, and for reasons of privacy they are often equipped with venetian blinds. The installation of standard blinds presents several problems and special blinds have disadvantages. The blind head and bottom rail must be held in fixed positions in order to prevent the blind from swinging back and forth during movement of the van. Also, window frames in vans are usually curved, making installation difficult.

Installation brackets for venetian blinds for vans are known in the art. The brackets for the head rail usually have a plastic plug shaped to fit the contour of one of the van window jambs with a spring-loaded plunger, and at the opposite end a plastic plug with a fixed pin. The bottom rails usually have end caps with a fixed pin of smaller diameter than the fixed head rail pin.

The known installation hardware for venetian blinds in an automotive van has several disadvantages. Installation of the head rail and bottom rail is sometimes difficult, and unless made to order for a particular window may leave unsightly gaps, especially at the head rail. Moreover, it is difficult to dislodge the bottom rail from the window jambs to raise the blind, and the same holds true for the head rail if it has to be removed.

It is, therefore, an object of the invention to provide improved installation hardware for the head rail and bottom rail of a venetian blind to be used in an automotive van.

More specifically, it is an object of the invention to overcome problems with prior art venetian blind installation hardware for automotive vans, namely to provide brackets which make the installation and removal of the bottom rail easier and which prevent unsightly gaps at the head rail, and to provide a solid installation of the head and bottom rail.

It is also an object of the invention to provide installation brackets which are universal in the sense that they can be used at both ends of the blind head, and bottom rail, respectively.

BRIEF SUMMARY OF THE INVENTION

The installation bracket for the head rail has a spring-loaded movable pin with a handle for retracting the pin, and has seals for closing light gaps and for preventing pivoting of the head rail, by frictional contact.

The installation bracket for the bottom rail has a springloaded movable pin that can be locked in retracted position.

BRIEF DISCUSSION OF THE DRAWINGS

The invention is illustrated by way of example in the attached drawings, in which:

FIG. 1 is a perspective view of a van window and of a venetian blind installed therein, with portions of the window frame and blind cut away;

FIG. 2 is an exploded perspective view of the encircled portion A of FIG. 1, showing the installation bracket for the head channel of the venetian blind;

FIG. 3 is a partial longitudinal section through the head channel, and installation bracket, after installation in the window frame;

FIG. 4 shows the encircled portion B of FIG. 1 in an exploded perspective view, showing the various elements connecting the bottom rail to the van window frame;

FIG. 5 is a longitudinal section through the bottom rail, and installation bracket, after installation in the window frame;

FIG. 6 is a longitudinal section through the bottom rail and installation bracket, after disengagement from the window frame, prior to the blind; and FIG. 7 is a cross-section through the bottom rail and installation bracket along line 7—7 of FIG. 6.

DETAILED DESCRIPTION OF A PREFERRED EMBODIMENT

Refering now to the drawings in detail, FIG. 1 shows a molded window 10 customarily used in automotive vans. It comprises, when looking from inside the van, an inner frame portion 12, an intermediate frame portion or jamb 14, and an outer frame portion 16, together forming an integral molded window frame. The intermediate frame portion 14 is provided on opposite sides with upper and lower openings 18, 20, only one each being visible in FIG. 1. Preferably, both openings are of the same diameter, but this is not necessary.

Installed in the window frame is a venetian blind generally designated with reference numeral 22. As is customary the venetian blind comprises a head channel 24, a plurality of slats 25 suspended from head channel 24 by means of two ladders 28, only one being visible in FIG. 1. The venetian blind also includes a bottom rail 30. Lifting and lowering of the blind is controlled by lift cords 31 while tilting of the slats from open to closed positions and vice versa is controlled by a knob 33. Lift and tilt control mechanisms are well known in the art and are not part of the present invention.

The present invention is concerned with the installation of the head rail 24 and bottom rail 30 in the van window 10, and more specifically, with installation brackets for this purpose. A bracket for the installation of the head rail 24 is illustrated in greater detail in FIGS. 2 and 3, and an installation bracket for the bottom rail 30 in FIGS. 4 to 7.

In customary manner the head rail 24 consists of a bottom wall 26, sidewalls 28, and inwardly bent flanges 29. The installation bracket for the head rail is generally designated with the reference numeral 32, and is made of a suitable plastic. Housing 32 has sidewalls 34, a front wall 36 and a rear wall 38. The housing is open at the bottom and top, and can be inserted into either end of head rail 24 so that sidewalls 34 rest underneath flanges 29 and until edges 37 of front wall 36 rest against front edge 27 of head rail 24.

The rear wall is provided with an integral pin 40. A hollow sleeve 42 extends from the front wall 36. It has a circular passage 44 and a key slot 46 conforming to the shape of a pin 48 with a cylindrical portion 50 and a key 52. Pin 48 also has a handle 54 next to key 52. A spring 56 extends into a bore 58 in pin 48 to bias the pin into a position (shown in FIG. 3), in which the handle 54 abuts against the sleeve 42 and in which a front portion 51 of pin 48 protrudes beyond front wall 36 and engages in opening 18 of window frame portion 14. In this way, the head rail is locked or fastened to the window frame.

The front wall 36 is provided with at least one, but preferably, two T-shaped grooves 60, for flexible rubber seals or spacers 62, made for instance of neoprene. The rubber seals prevent the head 24 which is pivotally supported about a single pivot axis (pins 50) from tilting, because of their frictional contact with jambs 14. They also close a light gap that may form since there is no cover overlapping the installation bracket as in a regular venetian blind and because the blind head 24 cannot be commercially measured and cut accurately to the window width. Moreover, they close the gap which forms in van windows contoured with a radius at the corners and/or with a tapered non-parallel jamb, which prevents snug fit at the ends of the blind head. Usually one seal 62 (rather than two) are used, especially if the space is very narrow because of the taper of the window frame. Thus, in FIG. 3 no seal is visible.

It is to be understood that there are two identical installation brackets installed in each head rail 24, one as shown in portion A of FIG. 1 and the other at the opposite end of the head rail. When installing the head rail in the window frame it may be sufficient to simply push the head rail with the installation brackets installed, from the wider inside portion 12 of the window frame to the narrower, outside portion 16. However, if necessary a knife or other very thin tool may be inserted between the flanges 30 and the window frame at one end of the head, to push the handle 54 slightly inwardly away from front wall 36 to thereby move the front end 51 of pin 48 sufficiently inwardly to facilitate movement of the head rail and brackets. As soon as front portion 51 of the pin registers with hole 18 it will engage therein because of the force of spring 56.

If the blind head has to be removed it is again sufficient to move handle 54 of one bracket inwardly until the front end 51 of pin 48 clears the hole 18. Movement of the handle can be facilitated by providing a bar 55 engaging handle 54 and resting on flanges 29.

The bottom rail 30 is provided with two end cap brackets 64 (only one being shown in FIG. 1) to hold the bottom rail 30 in a fixed position and prevent it from swinging back and forth within window frame 10 during movement of the van. More specifically, as illustrated in FIG. 4, the bottom rail 30 is open at its end 30a to receive an end bracket 64. The latter has an elongated body 66 of a shape generally conforming to that of the opening in bottom rail 30. The body 66 is slightly tapered to facilitate movement into the end bracket 30. The end bracket has an inner wall 68 with an integral pin 70. It also has a front wall 72 slightly larger than the inner cross-sectional area of bottom rail 30 so that it abuts against the front end 30a of the bottom rail 30. Body 66 also has two generally semi-circular sidewalls 74. A circular opening 76 extends from the front wall 72 through body 66 so as to receive therein a pin 78 with a handle 80. Pin 78 is provided with an opening 82 (see FIGS. 5 and 6) for a spring 84. In the locked position of the bottom rail handle 80 of pin 78 engages an edge 86 and pin 78 projects sufficiently beyond the front wall 72 to engage opening 20 in window frame portion 14 (FIG. 5).

When installing the blind, the bottom rail pin 78 can be retracted by pushing on the handle 80 with the fingers to position the bottom rail between the window jambs 14. But more likely, the end caps 64 would not be touched. A person grasps the bottom rail 30 and inserts one pin 78 into the hole 20 in one of the jambs 14. If necessary, the other end of the bottom rail is elevated until its pin 78 fits in the jamb. Then it is guided down whereby the pin 78 will retract as required until it is aligned with the hole 20 in the jamb and the pin will snap into the hole 20.

To raise the blind, the person reaches between the last slat 26 and the top of bottom rail 30 with his or her fingers and pushes the handle 80 away from the end of the rail to retract the pin 78 and pulls the bottom rail 30 out of alignment with the holes 20. The springs 84 exert only enough pressure to push the pins out so the pins exert so little friction against the jambs 14 so the blind can be raised and lowered.

However, pin 78 can be locked if desired, in the retracted position (FIGS. 6 and 7). The handle 80 is swung behind a locking step 88 inside the end bracket on one side wall 74. A slot 30b in the top of the bottom rail 30 provides space for this procedure. The bottom rail can then be lifted without difficulty. When it is desired to lock the same again in the opening 20 after lowering of the blind, it is merely necessary to push the handle 80 from the tilted position shown in FIG. 7 to its normal central position whereupon the spring 84 will push the pin 78 again into hole 20.

Several interesting features of the installation brackets should be emphasized:

The pins 50 and 78 are automatically in the released position, ready to snap into the respective holes 18, 20 in the window frame, except of course for pin 78 when its handle 80 has been deliberately locked behind step 88.

The pins 50 and 78 slide very easily without binding because they are supported in relatively long bearings (sleeve 42 and body 66, respectively).

Handle 54 will always be in the upright position, ready to be engaged by a thin tool, because of the keyway 46 and key 52.

The brackets 32 and 64 are preferably made of acrylonitrile butadiene styrene, but they could be made of other plastic materials, or of various metals.

I claim:

1. A bracket for connecting a head rail of a venetian blind to a window frame, comprising: a bracklet body shaped to be fit and held in an end of said head rail, said bracket body having a front face to face away from said head rail with a top and bottom, a passage extending from said front face into said body, a pin slidably received in said passage, a spring mounted in said bracket body and engaging said pin so that a front end of said pin normally protrudes from said passage beyond said front face, said pin having a handle for retracting the front end of said pin into said body passage against the force of said spring, at least one groove in said front face between said top and bottom, and seal means in said at least one groove for closing a gap between said front face and a window frame.

2. A bracket according to claim 1, wherein said bracket body has a sleeve around said passage with an end face remote from said front face, and wherein said handle normally engages said end face.

3. A bracket according to claim 1, wherein said passage and said pin are of non-round cross section, and said handle is fixed in relation to said pin to thereby positively locate the handle in said body.

4. A bracket according to claim 3, wherein said handle is accessible to a tool adjacent said top of said front face.

5. A bracket according to claim 1, wherein said bracket body has a wall remote from said front face, said wall having a protrusion, said spring having one end held by said protrusion, and another end held in said pin.

* * * * *